United States Patent [19]

Avidan et al.

[11] Patent Number: 5,012,026

[45] Date of Patent: Apr. 30, 1991

[54] TURBULENT FLUID BED PARAFFIN CONVERSION PROCESS

[75] Inventors: Amos A. Avidan, Yardley, Pa.; Margaret Nemet-Mavrodin, Cherry Hill; Jorge L. Soto, Westville, both of N.J.

[73] Assignee: Mobil Oil Corp., Fairfax, Va.

[21] Appl. No.: 310,136

[22] Filed: Feb. 14, 1989

[51] Int. Cl.$^5$ .............................................. C07C 5/00
[52] U.S. Cl. .................................. 585/417; 585/407; 585/412; 585/418; 585/419
[58] Field of Search ................. 585/412, 407, 417, 418, 585/419

[56] References Cited

U.S. PATENT DOCUMENTS

| | | | |
|---|---|---|---|
| 2,834,429 | 5/1958 | Kinsella, Jr. et al. | 183/114.2 |
| 3,756,942 | 9/1973 | Cattanach | 208/137 |
| 3,759,821 | 9/1973 | Brennan et al. | 585/415 |
| 3,894,932 | 7/1975 | Owen | 585/407 |
| 3,907,663 | 9/1975 | Owen | 585/407 |
| 4,172,027 | 10/1979 | Ham et al. | 585/412 |
| 4,547,616 | 10/1985 | Avidan et al. | 585/640 |
| 4,746,762 | 5/1988 | Avidan et al. | 585/415 |
| 4,766,264 | 8/1988 | Bennett et al. | 585/412 |
| 4,859,308 | 8/1989 | Harandi et al. | 585/407 |
| 4,929,334 | 5/1990 | Harandi et al. | 585/407 |

FOREIGN PATENT DOCUMENTS

WO88/00090 1/1988 European Pat. Off. .
1209524 2/1960 France .

*Primary Examiner*—Asok Pal
*Attorney, Agent, or Firm*—Alexander J. McKillop; Charles J. Speciale; Robert B. Furr, Jr.

[57] ABSTRACT

A fluid bed catalytic paraffin upgrading process is disclosed. By closely controlling catalyst particle size distribution and density, together with feedstock superficial vapor velocity, the fluid bed is maintained in a turbulent flow regime. Surprisingly, maintaining the fluid bed in a turbulent flow regime shifts the product selectivity away from methane and ethane and toward the more valuable products hydrogen, light olefins and $C_{5+}$ gasoline. In the most preferred embodiment, the catalyst contains a dehydrogenation metal component such as gallium, zinc, platinum or rhenium to provide a $C_{5+}$ gasoline product rich in aromatics. Catalysts useful in the inventive process include zeolites as well as layered siliceous materials.

24 Claims, 1 Drawing Sheet

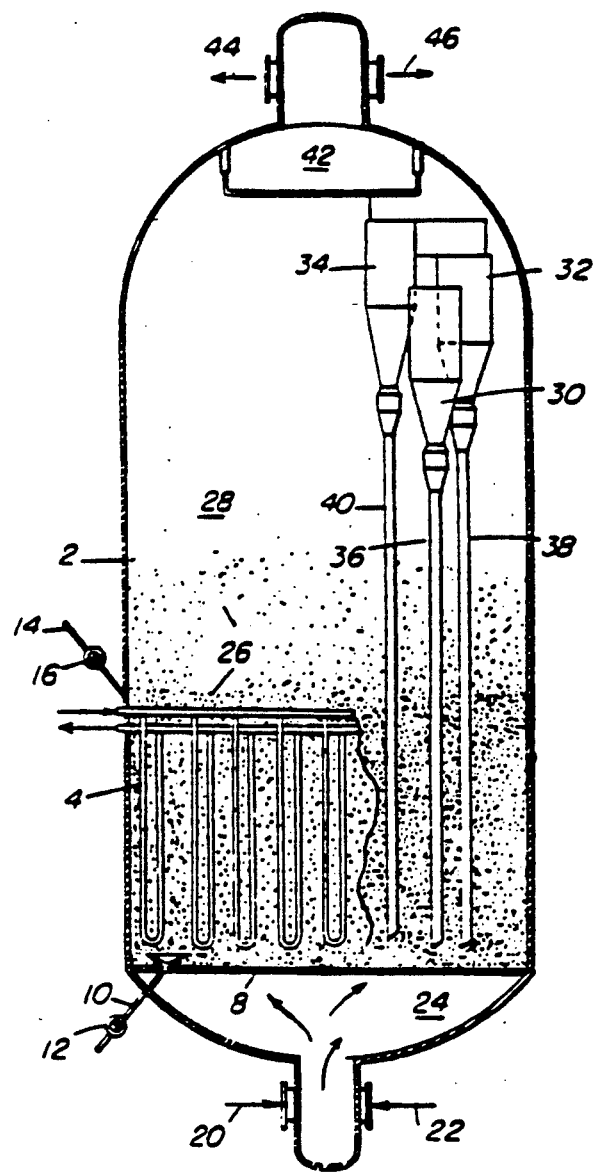

TURBULENT FLUID BED PARAFFIN CONVERSION PROCESS

BACKGROUND OF THE INVENTION

This invention relates to the conversion of paraffins into more valuable olefinic and aromatic products. In particular, the invention relates to controlling the fluidization regime of a fluidized bed of catalyst to improve selectivity toward valuable olefinic and aromatic products and away from methane and ethane.

Conversion of paraffinic feedstocks to more valuable aromatic and olefinic product streams is known. For example, U.S. Pat. No. 3,756,942 discloses a process for the preparation of aromatic compounds in high yields which involves contacting a particular feed consisting essentially of mixtures of paraffins and/or olefins, and/or naphthenes with a crystalline aluminosilicate, e.g. ZSM-5, under conditions of temperature and space velocity such that a significant portion of the feed is converted directly into aromatic compounds. U.S. Pat. No. 3,759,821 discloses a similar process for upgrading catalytically cracked gasoline. Finally, U.S. Pat. No. 3,760,024 teaches a process for the preparation of aromatic compounds which involves contacting a feed consisting essentially of $C_2$–$C_4$ paraffins and/or olefins with a crystalline aluminosilicate, e.g. ZSM-5. The above references are incorporated herein by reference and are cited in particular for descriptions of useful feedstocks and process conditions.

Conversion has been found to be enhanced in fluidized bed processes by maintaining the fluidized bed reaction zone in a turbulent regime. For example, U.S. Pat. No. 4,547,616 to Avidan et al. teaches a process for the conversion of oxygenates to lower olefins in a turbulent fluidized bed of catalyst. U.S. Pat. No. 4,746,762 to Avidan et al. teaches a process for upgrading light olefins in a turbulent fluidized catalyst bed reactor. The Avidan et al. references are incorporated herein by reference and are cited in particular for the details of fluidized-bed operating variables. While conversion improvements using turbulent fluidized beds have been reported, previous processes have failed to address controlling the fluidization regime to affect a shift in selectivity toward more desirable products.

In particular, the paraffin upgrading processes described by the references cited above produce product streams which comprise aliphatic and aromatic compounds together with hydrogen. The most economically attractive of these compounds are light olefins such as ethylene and propylene, $C_5+$ gasoline rich in aromatics, and hydrogen while the least desirable are methane and ethane. Further, hydrogen evolved in such upgrading processes may be consumed elsewhere in a refinery or petrochemical plant in processes such as lubricant dewaxing, catalytic desulfurization and catalytic reforming. Relatively unreactive and difficult to upgrade into more valuable products, methane and ethane are typically flared or burned as fuel gas. Thus, it can well be seen that it would be highly desirable to shift the yield of a paraffin upgrading process away from methane and ethane and toward hydrogen, light olefins such as ethylene and propylene and $C_5+$ gasoline rich in aromatics.

SUMMARY OF THE INVENTION

The present invention converts a feedstream comprising $C_2$–$C_{12}$ paraffins into a product stream comprising olefins and aromatics with enhanced selectivity for the desirable products of hydrogen, light $C_4-$ olefins and $C_5+$ gasoline. This unexpected shift in selectivity occurs when the fluidized catalyst bed is operated under closely controlled conditions of pressure, fines content and superficial gas velocity to maintain the fluidized bed in a turbulent regime. Dehydrogenation metals may be incorporated into the composite catalyst to provide a $C_5+$ gasoline product rich in aromatics.

The turbulent flow regime is preferably created by fluidizing a composite catalyst in the form of a Geldart Type A powder and maintaining the fines content at less than 40 wt. %. It is believed that a turbulent flow regime affords maximum contact between the catalyst and the reactants. While increased catalyst contact has been shown in other processes to enhance conversion, it is completely unexpected and in fact surprising that a shift in selectivity would result from a change in the fluidization flow regime.

The process may further comprise the steps of maintaining a fluidized bed of zeolite catalyst particles at a temperature of at least 540° C. (1000° F.), said catalyst having an apparent particle density of about 0.9 to 1.6 grams per cubic centimeter and a size range of about 1 to 150 microns, and average catalyst particle size of about 20 to 100 microns containing about 10 to 50 wt. % of fine particles having a particle size less than 32 microns, passing hot feedstock upwardly through the fluidized catalyst bed under turbulent flow conditions, maintaining turbulent fluidized bed conditions through the reactor bed between transition velocity and transport velocity at a superficial fluid velocity of about 0.3 to 2 meters per second, and recovering hydrocarbon product containing a major amount of olefins and aromatics.

DESCRIPTION OF THE DRAWING

The FIGURE is a schematic diagram of a fluidized bed reactor system useful in the present invention.

DETAILED DESCRIPTION

The process of the present invention shifts the selectivity of a fluidized-bed paraffin upgrading process to favor increased yield of valuable hydrogen, ethylene and $C_5+$ gasoline.

Conversion Process

Hydrocarbon feedstocks which can be converted according to the present process include various refinery streams including coker gasoline, light FCC gasoline, $C_5$–$C_7$ fractions of straight run naphthas and pyrolysis gasoline, as well as raffinates from a hydrocarbon mixture which has had aromatics removed by a solvent extraction treatment. Examples of such solvent extraction treatments are described on pages 706–709 of the *Kirk-Othmer Encyclopedia of Chemical Technology*, Third Edition, Vol. 9, John Wiley and Sons, 1980. A particular hydrocarbon feedstock derived from such a solvent extraction treatment is a Udex raffinate. The paraffinic hydrocarbon feedstock suitable for use in the present process may comprise at least 75 percent by weight, e.g. at least 85 percent by weight, of paraffins having from 5 to 10 carbon atoms. The most preferred conversion process useful with the present invention is a paraffin aromatization process conducted under process conditions listed in Table 1. Operating pressures shown in Table 1 are based on aromatizable hydrocarbon partial pressures.

TABLE 1

| | |
|---|---|
| WHSV | Broad range: 0.3–300 hr$^{-1}$ |
| | Preferred range: 0.4–5 hr$^{-1}$ |
| OPERATING PRESSURE | Broad: 7–2170 kPa (1–315 psia) |
| | Preferred: 135–240 kPa (7–15 psia) |
| OPERATING TEMPERATURE | Broad: 540–820° C. (1000–1500° F.) |
| | Preferred: 560–620° C. (1050–1150° F.) |

Medium-Pore Zeolite Catalysts

The members of the class of zeolites useful in the process of the present invention have an effective pore size of generally about 5 to about 8 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. The method by which the Constraint Index is determined is described in U.S. Pat. No. 4,016,218, incorporated herein by reference for details of the method. U.S. Pat. No. 4,696,732 discloses Constraint Index values for typical zeolite materials and is incorporated by reference as is set forth at length herein.

In a preferred embodiment, the catalyst is a zeolite having a Constraint Index of between about 1 and about 12. Examples of such zeolite catalysts include ZSM-5, ZSM-11, ZSM-12, ZSM-22, ZSM-23, ZSM-35 and ZSM-48.

Zeolite ZSM-5 and the conventional preparation thereof are described in U.S. Pat. No. 3,702,886, the disclosure of which is incorporated herein by reference. Other preparations for ZSM-5 are described in U.S. Pat. Re. Nos. 29,948 (highly siliceous ZSM-5); 4,100,262 and 4,139,600, the disclosure of these is incorporated herein by reference. Zeolite ZSM-11 and the conventional preparation thereof are described in U.S. Pat. No. 3,709,979, the disclosure of which is incorporated herein by reference. Zeolite ZSM-12 and the conventional preparation thereof are described in U.S. Pat. No. 3,832,449, the disclosure of which is incorporated herein by reference. Zeolite ZSM-23 and the conventional preparation thereof are described in U.S. Pat. No. 4,076,842, the disclosure of which is incorporated herein by reference. Zeolite ZSM-35 and the conventional preparation thereof are described in U.S. Pat. No. 4,016,245, the disclosure of which is incorporated herein by reference. Another preparation of ZSM-35 is described in U.S. Pat. No. 4,107,195, the disclosure of which is incorporated herein by reference. ZSM-48 and the conventional preparation thereof is taught by U.S. Pat. No. 4,375,573, the disclosure of which is incorporated herein by reference.

Dehydrogenation metals may be incorporated into the composite catalyst to maximize yield of hydrogen and $C_5+$ gasoline product rich in aromatics at the expense of olefins production. Examples of such metals include Group VIII metals such as platinum as well as gallium, zinc, and rhenium, of which gallium and zinc are preferred with gallium being the most preferred metal.

Gallium-containing zeolite catalysts which are particularly preferred for use in the present invention are disclosed in U.S. Pat. No. 4,350,835 and U.S. Pat. No. 4,686,312, both of which are incorporated by reference as if set forth in length herein.

Zinc-containing zeolite catalysts, also preferred for use in the present invention, are disclosed in, for example, U.S. Pat. No. 4,392,989 and U.S. Pat. No. 4,472,535, both of which are incorporated by reference as if set forth at length herein.

Catalysts including zeolites such as ZSM-5 combined with a Group VIII metal described in U.S. Pat. No. 3,856,872, incorporated by reference as if set forth at length herein, are also useful in the present invention.

The zeolites described above must be composited with an inert binder such that the resulting composite catalyst particles are characterized by a combination of size, shape and density as to be classified as Geldart Type A powders. For a discussion of fluidization in the Geldart Type classification system see U.S. Pat. No. 4,513,160 to Avidan, as well as Geldart *Powder Technology*, 7,285 (1973), both of which are incorporated by reference as if set forth at length herein. Briefly, a Geldart Type A powder is a finely divided, easily fluidizable solid.

The acid activity of the composite catalysts useful in the present invention are characterized by alpha values. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec $^{-1}$). The Alpha Test is described in U.S. Pat. No. 3,354,078, in the *Journal of Catalysis*, Vol. 4, p. 527 (1965); Vol. 6, p. 278 (1966); and Vol. 61, p. 395 (1980), each incorporated herein by reference as to that description. The experimental conditions of the text used herein include a constant temperature of 538° C. and a variable flow rate as described in detail in the *Journal of Catalysis*, Vol. 61, p. 395.

Layered Oxides

The composite catalysts useful in the present invention may also comprise a layered oxide material containing interlayer polymeric oxides. Examples of such materials are described in allowed U.S. application Ser. No. 879,787 filed Jun. 27, 1986 which is a continuation-in-part of U.S. application Ser. No. 687,414 filed Dec. 28, 1984, as well as PCT US 87/0144 published Jan. 14, 1988, both of which are incorporated herein by reference. These examples include a thermally stable composition comprising a non-swellable layered chalcogenide of an element having an atomic number of 4, 5, 12 to 15, 20 to 33, 38 to 51, 56 to 83 and greater than 90, inclusive, said layered metal chalcogenide comprising an interspathic polymeric chalcogenide of an element selected from Groups IB, IIB, IIIA, IIIB, IVA, IVB, VA, VB, VIA, VIIA, and VIIIA of the Periodic Table, a thermally stable composition comprising a layered chalcogenide of an element having an atomic number of 4, 5, 12 to 15, 20 to 33, 38 to 51, 56 to 83 and greater than 90, inclusive, said layered metal chalcogenide comprising an interspathic polymeric chalcogenide of an element selected from Group IVB of the Periodic Table, and said composition having a d-spacing greater than about 20 angstroms, and a layered titanate composition comprising interspathic polymeric silica, and having the X-ray diffraction pattern set out in Table 1 of U.S. application Ser. No. 879,787, cited above. Further examples include a layered product comprising a layered metal oxide and pillars of an oxide of at least one element selected from Groups IB, IIB, IIIA, IIIB, IVA, IVB, VA, VB, VIA, VIIA and VIIIA of the Periodic Table of the Elements separating the layers of the metal oxide, wherein each layer of the metal oxide has the general formula

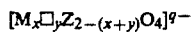

wherein M is at least one metal of valence n wherein n is an integer between 0 and 7, $\square$ represents a vacancy site, Z is a tetravalent metal, and wherein $q = 4y - x(n-4)$ $0 < x + y < 2.$ Referring now to the Figure, a reactor vessel 2 is shown provided with heat exchange tube means 4. Depending on factors including feed temperature and composition, the heat exchange tube means 4 may be employed to either heat or cool the reaction zone. The bottoms of the tubes are spaced above a feed distributor grid 8 sufficiently to be free of jet action by the charged feed through the small diameter holes in the grid. Provision is made for withdrawing catalyst from above grid 8 as by conduit means 10 provided with flow control valve 12 for passage to catalyst regeneration. Provision is also made for passing the partially regenerated catalyst to the reactor fluid bed of catalyst as by conduit means 14 provided with flow control valve 16. The regenerated catalyst is charged to the catalyst bed beneath the upper interface and sufficiently below to achieve good mixing in the fluid bed. Since the amount of regenerated catalyst passed to the reactor is small by comparison, the temperature of the regenerated catalyst does not upset the temperature constraints of the reactor operations to a significant degree.

The aliphatic hydrocarbon feed may be charged through one or more openings 20 and 22 in a bottom extended portion of the reactor. The feed enters chamber 24 and passes upwardly through reactant distributor grid 8 and into the bed of catalyst above at a velocity sufficient to form a generally upward flowing suspension of feed and product with the catalyst particles. To achieve the beneficial product selectivity shift of the present invention, it is critical that the fluidized bed be maintained in a turbulent flow regime.

A plurality of sequentially connected cyclone separator means 30, 32 and 34 provided with diplegs 36, 38 and 40 respectively are positioned in an upper portion of the reactor vessel comprising dispersed catalyst phase 28.

The product effluent of hydrocarbon conversion separated from catalyst particles in the cyclone separating system then passes to a plenum chamber 42 before withdrawal therefrom by one or more opening means 44 and 46. The product effluent recovered by openings 44 and 46 is cooled and separated in means not shown to recover liquid hydrocarbons and light hydrocarbon gas.

Under optimized conditions the turbulent bed has a superifical vapor velocity of about 0.3 to 2 meters per second (m/sec). At higher velocities entrainment of fine particles may become excessive and beyond 10 m/sec the entire bed may be transported out of the reaction zone. At lower velocities, the formation of large bubbles can be detrimental to conversion. Even fine particles cannot be maintained effectively in a turbulent bed below about 0.1 m/sec.

A convenient measure of turbulent fluidization is the bed density. A typical turbulent bed has an operating density of about 100 to 600 kg/m$^3$, and is preferably maintained at an operating density of about 300 to 400 kg/m$^2$, measured at the bottom of the reaction zone, becoming less dense toward the top of the reaction zone due to pressure drop and particle size differentiation. This density is generally between the catalyst concentration employed in dense beds and the dispersed transport systems. Pressure differential between two vertically spaced points in the reactor column can be measured to obtain the average bed density at such portion of the reaction zone. For instance, in a fluidized bed system employing catalyst particles having a clean apparent density of 1.06 gm/cc and packed density of 0.85, an average fluidized bed density of about 300 to 400 kg/m$^3$ is satisfactory. By virtue of the turbulence experienced in the turbulent regime, gas-solid contact in the catalytic reactor is improved, providing enhanced selectivity. One main feature of this concept is the inherent control of bubble size and characteristic bubble lifetime. Bubbles of the gaseous reaction mixture are small, random and short-lived, thus resulting in good contact between the gaseous reactants and the solid catalyst particles.

EXAMPLE 1

Turbulent Fluidization Regime

A mixture of $C_5$–$C_{12}$ aliphatic hydrocarbons from the Udex extraction of refinery light reformate, i.e. Udex raffinate, was converted to light olefins and aromatics over a fluid-bed catalyst incorporating 25 wt. % of ZSM-5 zeolite, at 0.5 weight hourly space velocity (WHSV) raffinate (based on total catalyst weight, including the matrix), 1150° F. and atmospheric pressure at a gas superficial velocity at the grid of 0.037 m/sec. The minimum slugging velocity for the reactor was 0.026 m/sec. The catalyst composite had an alpha activity of 33, as measured by the standard n-hexane cracking test.

| Net Yield, Wt. % | |
| --- | --- |
| $H_2$ | 2.5 |
| $CH_4$ | 12.2 |
| $C_2H_6$ | 7.0 |
| $C_2H_4$ | 12.8 |
| $C_3H_8$ | 6.6 |
| $C_3H_6$ | 10.1 |

-continued

| Net Yield, Wt. % | |
|---|---|
| $C_4H_8$ | 3.2 |
| Benzene | 18.3 |
| Toluene | 13.4 |
| $C_8$ Aromatics | 6.2 |

EXAMPLE 2

Comparative Bubbling Bed Fluidization Regime

In a second example, a second portion of Udex raffinate identical to that used in Example 1 was converted over the fluid-bed catalyst of Example 1 at 0.3 WHSV, 1150° F., 0 psig and at an inlet gas superficial velocity of 0.024 m/sec. The minimum bubbling and minimum slugging velocities for the reactor were 0.001 and 0.079 m/sec, respectively. Thus the catalyst was maintained in a bubbling dense bed flow regime.

| Net Yield, Wt. % | |
|---|---|
| $H_2$ | 1.5 |
| $CH_4$ | 14 |
| $C_2H_6$ | 9.4 |
| $C_2H_4$ | 15.6 |
| $C_3H_8$ | 4.7 |
| $C_3H_6$ | 15.4 |
| $C_4H_8$ | 5.4 |
| Benzene | 10.9 |
| Toluene | 7.2 |
| $C_8$ Aromatics | 3.4 |

Note that in comparison to the bubbling bed of Example 2, the turbulent bed of Example 1 yielded proportionately less methane and ethane while generating a proportionately greater amount of the valuable products hydrogen, ethylene, and $C_{5+}$ gasoline.

Changes and modifications in the specifically described embodiments can be carried out without departing from the scope of the invention which is intended to be limited only by the scope of the appended claims.

What is claimed is:

1. A fluidized bed catalytic process for the conversion of a feedstock comprising paraffins into a product stream containing olefins and aromatics comprising the steps of:
   (a) maintaining a fluidized bed of catalyst particles under paraffin aromatization conditions in a turbulent sub-transport flow regime;
   (b) controlling the relative concentration of catalyst particles having a major dimension of less than 32 microns at between 10 and 50 weight percent, said catalyst particles having an apparent particle density of about 0.9 to 1.6 grams per cubic centimeter and a size range of about 1 to 150 microns, and an average catalyst catalyst particle size of about 20 to 100 microns;
   (c) charging said feedstock to said fluidized bed at a rate sufficient to provide a superficial fluid velocity within said fluid bed of about 0.3 to about 2 meters per second; and
   (d) recovering hydrocarbon product containing a major amount of olefins and aromatics.

2. The process of claim 1 wherein said catalyst contains a zeolite.

3. The process of claim 2 wherein said zeolite has a Constraint Index of between about 1 and 12.

4. The process of claim 3 wherein said zeolite has the structure of at least one selected from the group consisting of ZSM-5, ZSM-11, ZSM-22, ZSM-23, ZSM-35, and ZSM-48.

5. The process of claim 3 wherein said zeolite has the structure of ZSM-5.

6. The process of claim 2 wherein said zeolite contains at least one Group VIII metal.

7. The process of claim 2 wherein said zeolite contains at least one metal selected from the group consisting of gallium, zinc, platinum and rhenium.

8. The process of claim 7 wherein said zeolite contains gallium.

9. The process of claim 1 wherein said catalyst comprises a layered siliceous material.

10. The process of claim 1 wherein said catalyst comprises a thermally stable composition comprising a nonswellable layered chalcogenide of an element having an atomic number of 4, 5, 12 to 15, 20 to 33, 38 to 51, 56 to 83 and greater than 90, inclusive, said layered metal chalcogenide comprising an interspathic polymeric chalcogenide of an element selected from Groups IB, IIB, IIIA, IIIB, IVA, IVB, VA, VB, VIA, VIIA, and VIIIA of the Periodic Table.

11. The process of claim 1 wherein said catalyst comprises a thermally stable composition comprising a layered chalcogenide of an element having an atomic number of 4, 5, 12 to 15, 20 to 33, 38 to 51, 56 to 83 and greater than 90, inclusive, said layered metal chalcogenide comprising an interspathic polymeric chalcogenide of an element selected from Group IVB of the Periodic Table, and said composition having a d-spacing greater than about 20 angstroms.

12. The process of claim 1 wherein said catalyst comprises a layered titanosilicate composition comprising interspathic polymeric silica, and having the X-ray diffraction pattern set forth in Table 1 of U.S. Pat. No. 4,859,648 to Landis et al.

13. The process of claim 1 wherein said catalyst comprises a layered product comprising a layered metal oxide and pillars of an oxide of at least one element selected from Groups IB, IIB, IIIA, IIIB, IVA, IVB, VA, VB, VIA, VIIA and VIIIA of the Periodic Table of the Elements separating the layers of the metal oxide, wherein each layer of the metal oxide has the general formula

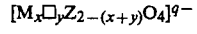

wherein M is at least one metal of valence n wherein n is an integer between 0 and 7, □ represents a vacancy site, Z is a tetravalent metal, and wherein $q = 4y - x(n-4)$ $0 < x + y < 2.$ 14. A fluidized bed catalytic process for the conversion of a feedstock comprising paraffins into a product stream containing olefins and aromatics comprising the steps of:
   (a) maintaining a fluidized bed of catalyst particles in a turbulent reactor bed under paraffin aromatization conditions, said catalyst having an apparent particle density of about 0.9 to 1.6 grams per cubic centimeter and a size range of about 1 to 150 microns, an average catalyst particle size of about 20 to 100 microns containing about 10 to 25 weight percent of fine particles having a particle size less than 40 microns;

(b) charging feedstock to the fluidized catalyst bed under turbulent flow conditions;

(c) maintaining turbulent fluidized bed conditions through the reactor bed between transition velocity and transport velocity at a superficial fluid velocity of about 0.3 to 2 meters per second; and (d) recovering hydrocarbon product containing a major amount of olefins and aromatics.

15. The process of claim 14 wherein the fluidized bed density is about 300 to 400 kilograms per cubic meter, measured at the bottom of the bed.

16. The process of claim 14 wherein said catalyst comprises a zeolite having a Constraint Index of between about 1 and 12.

17. The process of claim 16 wherein said zeolite has the structure of at least one selected from the group consisting of ZSM-5, ZSM-11, ZSM-22, ZSM-23, ZSM-35, and ZSM-48.

18. The process of claim 17 wherein said zeolite has the structure of ZSM-5.

19. The process of claim 17 wherein said zeolite contains gallium.

20. The process of claim 14 wherein said catalyst comprises a layered siliceous material.

21. The process of claim 14 wherein said catalyst comprises a thermally stable composition comprising a non-swellable layered chalcogenide of an element having an atomic number of 4, 5, 12 to 15, 20 to 33, 38 to 51, 56 to 83 and greater than 90, inclusive, said layered metal chalcogenide comprising an interspathic polymeric chalcogenide of an element selected from Groups IB, IIB, IIIA, IIIB, IVA, IVB, VA, VB, VIA, VIIA, and VIIIA of the Periodic Table.

22. The process of claim 14 wherein said catalyst comprises a thermally stable composition comprising a layered chalcogenide of an element having an atomic number of 4, 5, 12 to 15, 20 to 33, 38 to 51, 56 to 83 and greater than 90, inclusive, said layered metal chalcogenide comprising an interspathic polymeric chalcogenide of an element selected from Group IVB of the Periodic Table, and said composition having a d-spacing greater than about 20 angstroms.

23. The process of claim 14 wherein said catalyst comprises a layered titanosilicate composition comprising interspathic polymeric silica, and having the X-ray diffraction pattern set forth in Table 1 of U.S. Pat. No. 4,859,648 to Landis et al.

24. The process of claim 14 wherein said catalyst comprises a layered product comprising a layered metal oxide and pillars of an oxide of at least one element selected from Groups IB, IIB, IIIA, IIIB, IVA, IVB, VA, VB, VIA, VIIA and VIIIA of the Periodic Table of the Elements separating the layers of the metal oxide, wherein each layer of the metal oxide has the general formula $$[M_x\square_y Z_{2-(x+y)}O_4]^{q-}$$

wherein M is at least one metal of valence n wherein n is an integer between 0 and 7, $\square$ represents a vacancy site, Z is a tetravalent metal, and wherein $$q = 4y - x(n-4)$$

$$0 < x + y < 2.$$

* * * * *